United States Patent
Li

(10) Patent No.: US 8,143,857 B2
(45) Date of Patent: Mar. 27, 2012

(54) BATTERY MONITORING SYSTEMS

(75) Inventor: Guoxing Li, Sunnyvale, CA (US)

(73) Assignee: O2Micro Inc., Santa Clara, CA (US)

( * ) Notice: Subject to any disclaimer, the term of this patent is extended or adjusted under 35 U.S.C. 154(b) by 0 days.

(21) Appl. No.: 12/976,703

(22) Filed: Dec. 22, 2010

(65) Prior Publication Data
US 2012/0009445 A1 Jan. 12, 2012

(51) Int. Cl.
*H01M 10/46* (2006.01)
(52) U.S. Cl. ...................................................... 320/132
(58) Field of Classification Search .................. 320/107, 320/116, 132, 149, DIG. 21; 324/426, 427, 324/430, 433
See application file for complete search history.

(56) References Cited

U.S. PATENT DOCUMENTS
7,710,102 B2 * 5/2010 Shim .......................... 324/76.52
* cited by examiner

*Primary Examiner* — Edward Tso

(57) ABSTRACT

A battery monitoring system includes a first module and a second module coupled to the first module. The first module shifts a reference signal to a first shifted signal. The second module shifts the reference signal to a second shifted signal and shifts the first shifted signal to a third shifted signal. The second module also monitors a set of cells through the first module and provides an output signal indicative of a status of the set of cells. The second and third shifted signals are usable for calibrating the output signal.

20 Claims, 5 Drawing Sheets

BATTERY MONITORING SYSTEMS

BACKGROUND

FIG. 1 illustrates a block diagram of a conventional battery monitoring system (BMS) 100 for monitoring multiple sets of cells 112, 114 and 116. The BMS 100 includes multiple battery monitoring units (BMUs) 102, 104 and 106 to monitor the cells 112, 114 and 116, respectively. The BMS 100 further includes a central controller 120 to communicate with the BMUs 102, 104 and 106 and control all the cells 112, 114 and 116 according to cell information from the BMUs 102, 104 and 106.

As shown in FIG. 1, each of BMUs 102, 104 and 106 includes a combined circuit of a level-shifter and a multiplexer (LS/MUX) 122 to selectively receive cell voltages, an analog-to-digital converter (ADC) 124 to convert the cell voltages to digital signals, a micro-controller (MCU) 126 to control the LS/MUX 122 and the ADC 124, a register bank 128 to store the digital signals, and an opto-coupler (OPT) 130 to communicate with the central controller 120. Moreover, each of the BMUs 102, 104 and 106 includes a digital filter (not shown in FIG. 1) for the ADC 124. Each ADC 124 needs a trimming process before monitoring the cell voltages. In other words, the BMS 100 includes multiple ADCs 124, multiple MCUs 126, multiple register banks 128, and multiple digital filters for the ADCs 124. Furthermore, the BMS 100 needs multiple trimming processes for the ADCs 124. The cost and power consumption of the BMS 100 are relatively high. The size of the printed circuit board (PCB) for the BMS 100 is also relatively large.

SUMMARY

In one embodiment, a battery monitoring system includes a first module and a second module coupled to the first module. The first module shifts a reference signal to a first shifted signal. The second module shifts the reference signal to a second shifted signal and shifts the first shifted signal to a third shifted signal. The second module also monitors a set of cells through the first module and provides an output signal indicative of a status of the set of cells. The second and third shifted signals are usable for calibrating the output signal.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

In one embodiment, the present invention provides a battery monitoring system. The battery monitoring system includes multiple monitoring modules to monitor multiple sets of cells. Each monitoring module can monitor cell information for a corresponding set of cells. The battery monitoring system also includes a controller to control the multiple sets of cells according to the cell information. In addition, a module of the multiple monitoring modules can transfer the monitored cell information to the controller through one or more of the other modules of the multiple monitoring modules. Thus, in one embodiment, the controller can receive cell information of all the cells from one monitoring module. Advantageously, in one such embodiment, the battery monitoring system does not need multiple ADCs, multiple MCUs, multiple register backs, and multiple digital filters for the ADCs.

Figure 2:
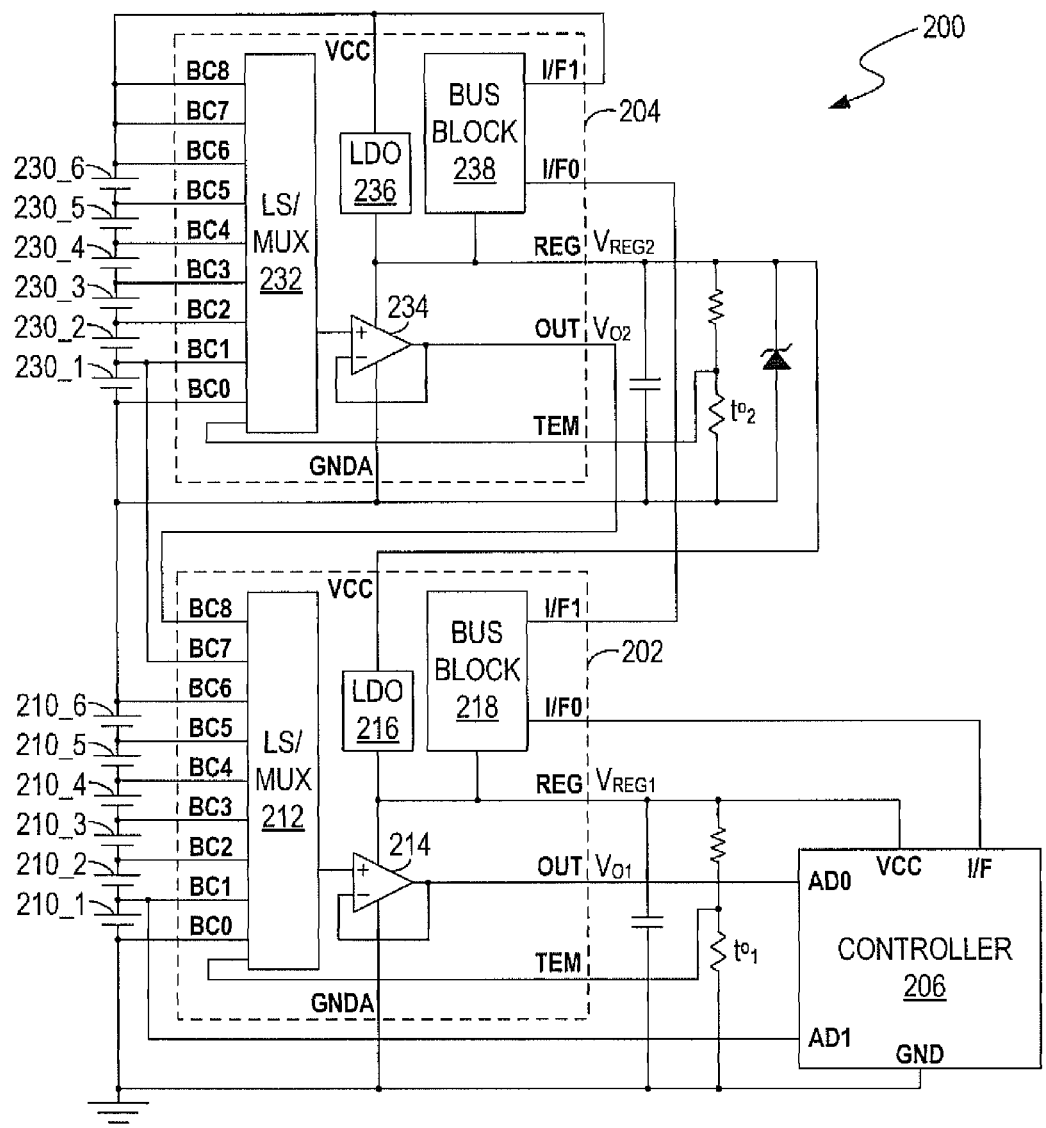
FIG. 2 illustrates a block diagram of an example of a battery monitoring system, in accordance with one embodiment of the present invention.

FIG. 2 illustrates a block diagram of an example of a battery monitoring system (BMS) 200, in accordance with one embodiment of the present invention. The BMS 200 can monitor a set of cells 210_1-210_6 and a set of cells 230_1-230_6. As shown in FIG. 2, the BMS 200 includes a low-side monitoring module 202 (hereinafter, low-side module 202) to monitor the cells 210_1-210_6 and a high-side monitoring module 204 (hereinafter, high-side module 204) to monitor the cells 230_1-230_6. The BMS 200 further includes a controller 206, e.g., a micro-controller, a processor, etc. The controller 206 can receive cell information of the cells 210_1-210_6 and 230_1-230_6 from the low-side module 202, convert the cell information to digital signals, and control the cells 210_1-210_6 and 230_1-230_6 according to the digital signals.

In one embodiment, each of the modules 202 and 204 includes multiple monitoring terminals BC0-BC8 to monitor input signals, e.g., cell voltages of the cells 210_1-210_6 or the cells 230_1-230_6, an output terminal OUT (hereinafter, OUT terminal) to provide an output signal indicative of a selected input signal, an input terminal TEM to receive temperature information, an output terminal REG (hereinafter, REG terminal) to provide a power voltage, a power input terminal VCC to receive a power supply voltage, a terminal GNDA to receive a common ground voltage, and an upper bus interface I/F1 and a lower bus interface I/F0 to transfer control signals from the controller 206. The controller 206 includes an input terminal AD0 to monitor an output signal from the OUT terminal of the low-side module 202, an input terminal AD1 to receive a reference signal, e.g., the cell voltage $V_{CELL1}$ of the cell 210_1, a power input terminal VCC to receive a power supply voltage, a bus interface I/F to provide control signals to control the cells 210_1-210_6 and the cells 230_1-230_6, and a terminal GND coupled to ground.

in one embodiment, the high-side module 204 includes a combined circuit of a level-shifter and a multiplexer (LS/

MUX) 232, a buffer 234, e.g., an operational amplifier, a low-dropout voltage regulator (LDO) 236, and a bus block 238. The LS/MUX 232 selectively receives an input signal via two corresponding terminals of the monitoring terminals BC0-BC8, shifts the input signal to a voltage level that is relative to the common ground voltage of the high-side module 204, e.g., the voltage at the monitoring terminal BC0 of the high-side module 204, and transfers the input signal to the buffer 234. The buffer 234 further transfers the input signal to the OUT terminal of the high-side module 204. The LDO 236 receives a power supply voltage and generates a regulated output voltage $V_{REG2}$ to the REG terminal of the high-side module 204. In one embodiment, the output voltage $V_{REG2}$ can be used to enable communication between the bus blocks 238 and 218. The output voltage $V_{REG2}$ can also be used to power a circuit, e.g., the low-side module 202. The bus block 238 can receive and/or transfer control signals from the controller 206.

Similarly, the low-side module 202 includes an LS/MUX 212, a buffer 214, e.g., an operational amplifier, an LDO 216, and a bus block 218. The LS/MUX 212 selectively receives an input signal via two corresponding terminals of the monitoring terminals BC0-BC8, shifts the input signal to a voltage level that is relative to ground, and transfers the input signal to the buffer 214. The buffer 214 further transfers the input signal to the OUT terminal of the low-side module 202. The LDO 216 receives a power supply voltage, e.g., the output voltage $V_{REG2}$, and generates a regulated output voltage $V_{REG1}$ to the REG terminal of the low-side module 202. In one embodiment, the output voltage $V_{REG1}$ can be used to enable communication between the bus blocks 238 and 218. The output voltage $V_{REG1}$ can also be used to power a circuit, e.g., the controller 206. The bus block 218 can receive and transfer control signals from the controller 206.

In one embodiment, in the high-side module 204, the LS/MUX 232 cooperates with the buffer 234 to receive a cell voltage of each cell of the cells 230_1-230_6 and generate an output signal $V_{O2}$, e.g., at the OUT terminal of the high-side module 204, indicative of the cell voltage of each cell of the cells 230_1-230_6. In the low-side module 202, the LS/MUX 212 cooperates with the buffer 214 to receive a cell voltage of each cell of the cells 210_1-210_6 and generate an output signal $V_{O1}$, e.g., at the OUT terminal of the low-side module 202, indicative of the cell voltage of each cell of the cells 210_1-210_6. Additionally, the low-side module 202 can monitor the cells 230_1-230_6 through the high-side module 204 and provide an output signal $V'_{O2}$ indicative of a cell voltage of each cell of the cells 230_1-230_6. By way of example, the low-side module 202 can receive the output signal $V_{O2}$ from the high-side module 204 via the OUT terminal of the high-side module 204 and the monitoring terminal BC8 of the low-side module 202, and generate the output signal $V'_{O2}$ indicative of the output signal $V_{O2}$ at the OUT terminal of the low-side module 202. Thus, in one such embodiment, the controller 206 can receive cell information of the cells 210_1-210_6 and 230_1-230_6 from the low-side module 202, and control the cells 210_1-210_6 and 230_1-230_6 according to the cell information. The controller 206 can generate an instruction signal to control the cells 210_1-210_6 via the bus block 218. The controller 206 can also generate an instruction signal to control the cells 230_1-230_6 via the bus block 218 and the bus block 238.

Figure 1:
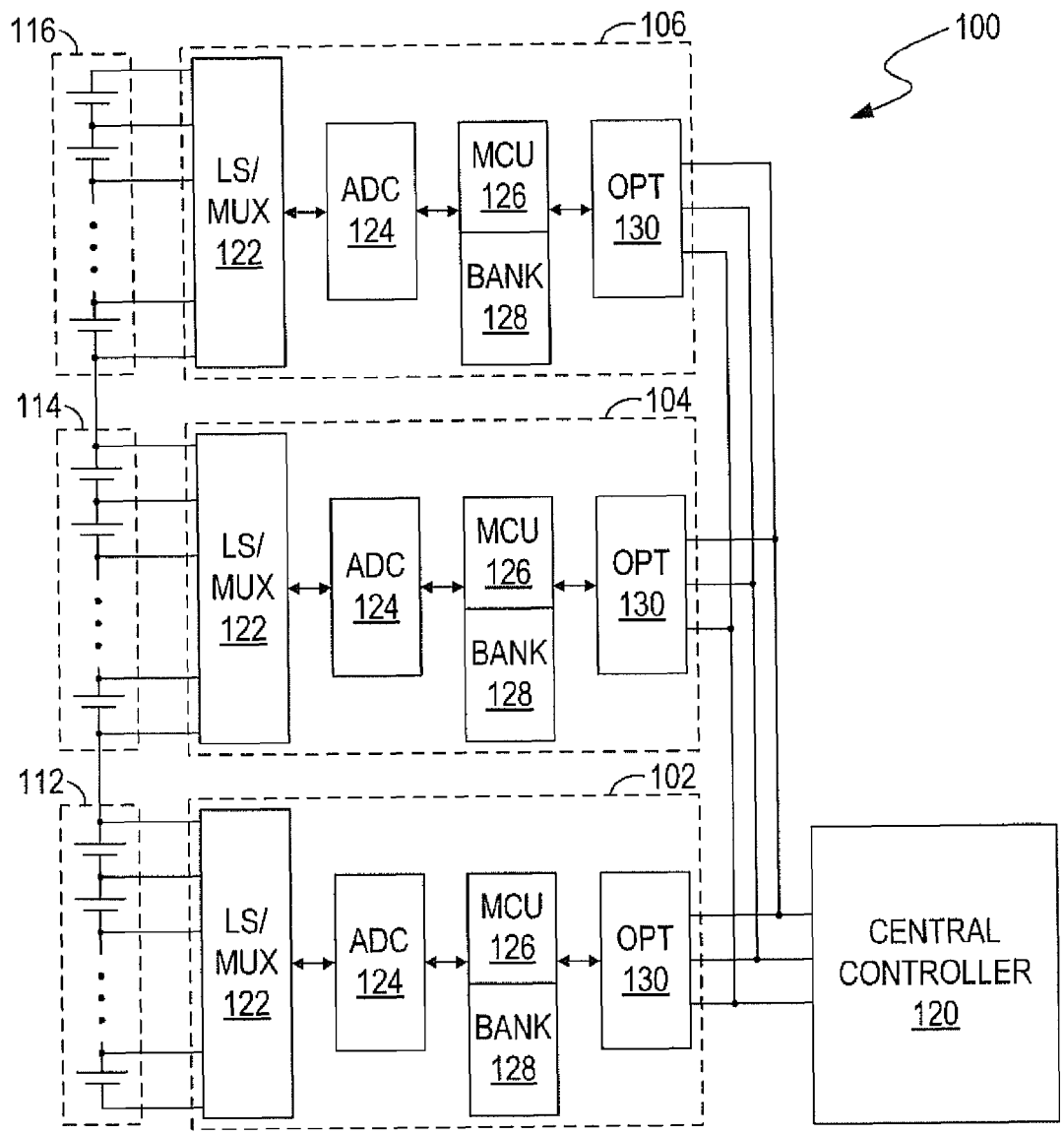
FIG. 1 illustrates a block diagram of a conventional battery monitoring system.

Advantageously, compared with the BMS 100 in FIG. 1, the multiple ADCs 124, the multiple MCUs 126, the multiple register banks 128, the multiple digital filters for the ADCs 124 are omitted in the BMS 200. The multiple trimming processes for the ADCs 124 in the BMS 100 are also omitted in the BMS 200. Thus, the cost, the power consumption, and the size of the printed circuit board (PCB) for the BMS 200 are reduced.

However, in one embodiment, the high-side module 204 may have an error factor $ER_2$, e.g., including an input voltage offset of the buffer 234 and/or a voltage offset in the LS/MUX 232 and/or resistor mismatch in the LS/MUX 232. The low-side module 202 may also have an error factor $ER_1$, e.g., including an input voltage offset of the buffer 214 and/or a voltage offset in the LS/MUX 212 and/or resistor mismatch in the LS/MUX 212. Thus, the output signal $V_{O1}$ of the low-side module 202 can be determined by a corresponding cell voltage of the cells 210_1-210_6 and the error factor $ER_1$ of the low-side module 202. The output signal $V'_{O2}$ can be determined by a corresponding cell voltage of the cells 230_1-230_6, and determined by the error factor $ER_2$ of the high-side module 204 and the error factor $ER_1$ of the low-side module 202.

Advantageously, in one embodiment, the low-side module 202 cooperates with the high-side module 204 to provide shifted signals to the controller 206. The controller 206 calculates the error factors $ER_1$ and $ER_2$ according to the shifted signals and calibrates (or corrects) the output signals $V_{O1}$ and $V'_{O2}$ based on the calculated error factors $ER_1$ and $ER_2$.

More specifically, in one embodiment, the low-side module 202 shifts a reference signal, e.g., the cell voltage $V_{CELL1}$ of the cell 210_1, to a shifted signal $V_{S4}$. For example, the low-side module 202 receives the cell voltage $V_{CELL1}$ of the cell 210_1 via the monitoring terminals BC1 and BC0 of the low-side module 202, and generates the shifted signal $V_{S4}$ indicative of the cell voltage $V_{CELL1}$ to the OUT terminal of the low-side module 202. The shifted signal $V_{S4}$ is determined by the cell voltage $V_{CELL1}$ and the error factor $ER_1$ of the low-side module 202. The controller 206 receives the shifted signal $V_{S4}$ via the input terminal AD0 and the cell voltage $V_{CELL1}$ via the input terminal AD1, and calculates the error factor $ER_1$ of the low-side module 202 according to the cell voltage $V_{CELL1}$ and the shifted signal $V_{S4}$.

Moreover, the high-side module 204 shifts a reference signal, e.g., the cell voltage $V_{CELL7}$ of the cell 230_1, to a first shifted signal $V_{S1}$. The low-side module 202 also shifts the reference signal $V_{CELL7}$ to a second shifted signal $V_{S2}$. The low-side module 202 further shifts the first shifted signal $V_{S1}$ to a third shifted signal $V_{S3}$. By way of example, the high-side module 204 receives the cell voltage $V_{CELL7}$ via the monitoring terminals BC1 and BC0 of the high-side module 204, and generates the first shifted signal $V_{S1}$ indicative of the cell voltage $V_{CELL7}$ to the OUT terminal of the high-side module 204. The first shifted signal $V_{S1}$ is determined by the cell voltage $V_{CELL7}$ and the error factor $ER_2$ of the high-side module 204. In addition, the low-side module 202 receives the cell voltage $V_{CELL7}$ via the monitoring terminals BC7 and BC6 of the low-side module 202, and generates the second shifted signal $V_{S2}$ indicative of the cell voltage $V_{CELL7}$ to the OUT terminal of the low-side module 202. The second shifted signal $V_{S2}$ is determined by the cell voltage $V_{CELL7}$ and the error factor $ER_1$ of the low-side module 202. Moreover, the low-side module 202 receives the first shifted signal $V_{S1}$ via the OUT terminal of the high-side module 204 and the monitoring terminal BC8 of the low-side module 202, and generates the third shifted signal $V_{S3}$ indicative of the first shifted signal $V_{S1}$ to the OUT terminal of the low-side module 202. The third shifted signal $V_{S3}$ is determined by the first shifted signal $V_{S1}$ and the error factor $ER_1$ of the low-side module 202. Since the error factor $ER_1$ can be obtained in a manner mentioned above, the controller 206 calculates the cell voltage $V_{CELL7}$ according to the second shifted signal $V_{S2}$ and the error factor $ER_1$. The controller 206 also calculates the first shifted signal $V_{S1}$ according to the third shifted signal $V_{S3}$ and the error factor $ER_1$. Thus, the controller 206 calculates the error factor $ER_2$ of the high-side module 204 according to the calculated cell voltage $V_{CELL7}$ and the calculated first shifted signal $V_{S1}$. In other words, the controller 206 can calculate the error factor $ER_2$ of the high-side module 204 according to the error factor $ER_1$ of the low-side module 202 and according to the second and third shifted signals $V_{S2}$ and $V_{S3}$.

As a result, advantageously, the controller 206 can receive the output signal $V_{O1}$ indicative of a cell voltage of the cells 210_1-210_6 and calibrate the output signal $V_{O1}$ based on the calculated error factor $ER_1$. The controller 206 can also receive the output signal $V'_{O2}$ indicative of a cell voltage of the cells 230_1-230_6 and calibrate the output signal $V'_{O2}$ based on the calculated error factors $ER_1$ and $ER_2$.

In one embodiment, the controller 206 monitors the temperature $t°_1$ of the cells 210_1-210_6 and the temperature $t°_2$ of the cells 230_1-230_6 in a similar manner.

Although the cell voltages of the bottom cells 210_1 and 230_1 are used as reference signals for the calibration process in the example of FIG. 2, the cell voltages of the other cells 210_2-210_6 and 230_2-230_6 can also be used as reference signals for the calibration process in one embodiment. The calibration process, in one such embodiment, can be performed in a similar manner.

Figure 3:
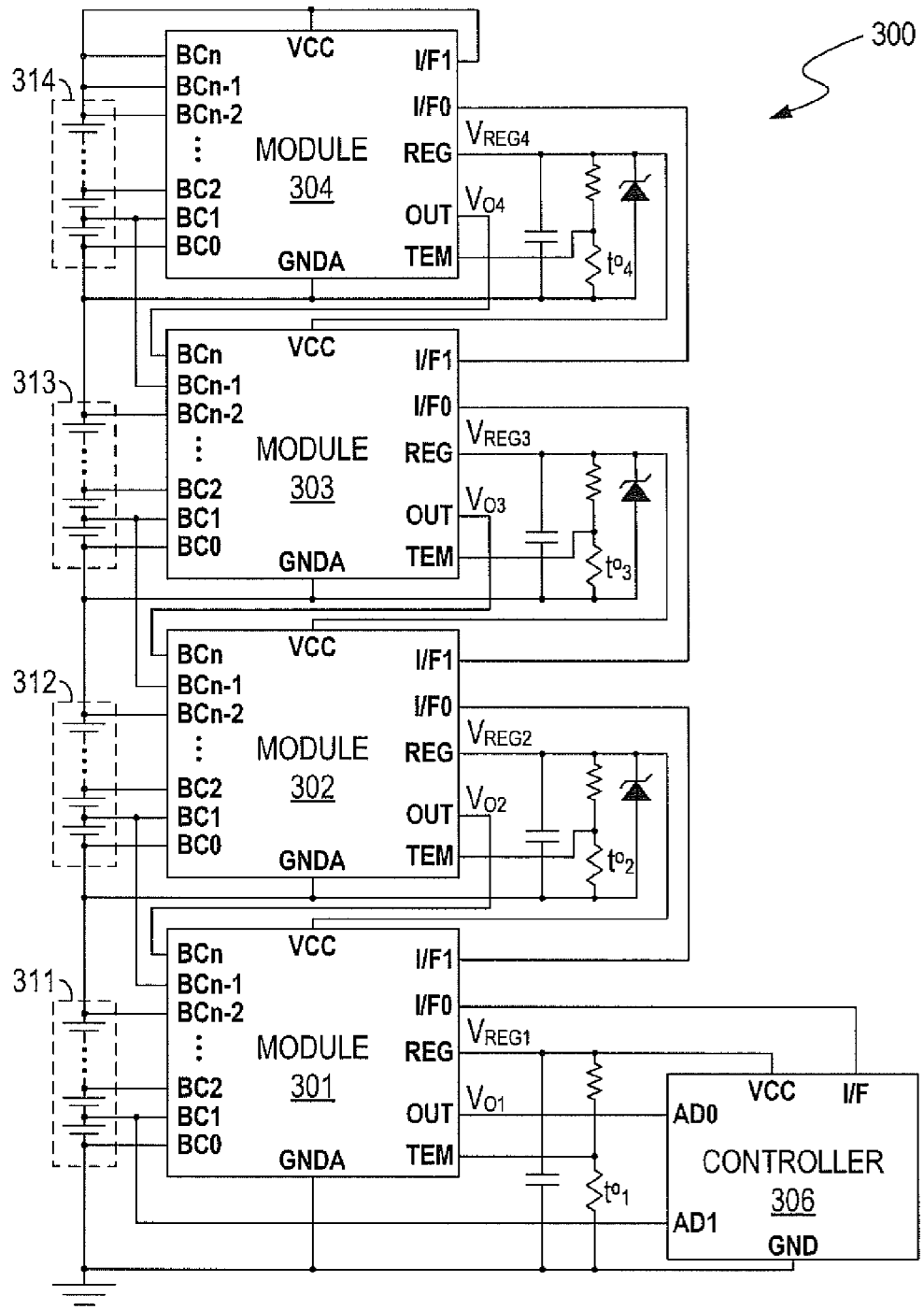
FIG. 3 illustrates a block diagram of an example of a battery monitoring system, in accordance with one embodiment of the present invention.

Although, in the example of FIG. 2, the BMS 200 includes two monitoring modules and each monitoring module includes eight monitoring terminals, the invention is not so limited. In one embodiment, a battery monitoring system can include any number of similar monitoring modules, and each monitoring module can include any number of monitoring terminals. FIG. 3 illustrates a block diagram of an example of a BMS 300, in accordance with one embodiment of the present invention.

As shown in FIG. 3, the BMS 300 includes multiple monitoring modules 301, 302, 303 and 304 to monitor multiple sets of cells 311, 312, 313 and 314, respectively. Each of the monitoring modules 301, 302, 303 and 304 can have similar structure to the module 202 or 204 in FIG. 2.

Similar to the calibration process described in relation to FIG. 2, in the example of FIG. 3, a first reference signal, e.g., the cell voltage of the bottom cell of the cells 311, is received at the monitoring module 301 to be shifted to a shifted signal $V_{S4}$. The controller 306 calculates an error factor $ER_1$ of the monitoring module 301 according to the first reference signal and the shifted signal $V_{S4}$. In addition, a second reference signal, e.g., the cell voltage of the bottom cell of the cells 312, is received at the monitoring module 302 to be shifted to a shifted signal $V_{S1}$. The second reference signal and the shifted signal $V_{S1}$ are further received at the monitoring module 301 to be respectively shifted to a shifted signal $V_{S2}$ and a shifted signal $V_{S3}$. Thus, the controller 306 calculates an error factor $ER_2$ of the monitoring module 302 according to the shifted signals $V_{S2}$ and $V_{S3}$ and according to the error factor $ER_1$. Moreover, a third reference signal, e.g., the cell voltage of the bottom cell of the cells 313, is received at the monitoring module 303 to be shifted to a shifted signal $V_{S5}$. The third reference signal and the shifted signal $V_{S5}$ are further received at the monitoring module 302, transferred to the controller 306 through the monitoring modules 302 and 301, and respectively shifted to a shifted signal $V_{S6}$ and a shifted signal $V_{S7}$. Thus, the controller 306 calculates an error factor $ER_3$ of the monitoring module 303 according to the shifted signals $V_{S6}$ and $V_{S7}$ and according to the error factors $ER_1$ and $ER_2$. Furthermore, a fourth reference signal, e.g., the cell voltage of the bottom cell of the cells 314, is received at the monitoring module 304 to be shifted to a shifted signal $V_{S8}$. The fourth reference signal and the shifted signal $V_{S8}$ are further received at the monitoring module 303, transferred to the controller 306 through the monitoring modules 303, 302 and 301, and respectively shifted to a shifted signal $V_{S9}$ and a shifted signal $V_{S10}$. Thus, the controller 306 calculates an error factor $ER_4$ of the monitoring module 304 according to the shifted signals $V_{S9}$ and $V_{S10}$ and according to the error factors $ER_1$, $ER_2$ and $ER_3$.

Additionally, the controller 306 can monitor the cells 311 via the monitoring module 301, monitor the cells 312 via the monitoring modules 302 and 301, monitor the cells 313 via the monitoring modules 303, 302 and 301, and monitor the cells 314 via the monitoring modules 304, 303, 302 and 301. By way of example, a cell voltage of each cell of the cells 311 is received at the monitoring module 301, transferred through the monitoring module 301, and shifted to an output signal $V_{O1}$ at the OUT terminal of the monitoring module 301. A cell voltage of each cell of the cells 312 is received at the monitoring module 302, transferred through the monitoring modules 302 and 301, and shifted to an output signal $V'_{O2}$ at the OUT terminal of the monitoring module 301. A cell voltage of each cell of the cells 313 is received at the monitoring module 303, transferred through the monitoring modules 303, 302 and 301, and shifted to an output signal $V'_{O3}$ at the OUT terminal of the monitoring module 301. A cell voltage of each cell of the cells 314 is received at the monitoring module 304, transferred through the monitoring modules 304, 303, 302 and 301, and shifted to an output signal $V'_{O4}$ at the OUT terminal of the monitoring module 301.

Advantageously, the controller 306 can calibrate the output signal $V_{O1}$ based on the error factor $ER_1$. The controller 306 can also calibrate the output signal $V'_{O2}$ based on the error factors $ER_1$ and $ER_2$. The controller 306 can also calibrate the output signal $V'_{O3}$ based on the error factors $ER_1$, $ER_2$ and $ER_3$. The controller 306 can also calibrate the output signal $V'_{O4}$ based on the error factors $ER_1$, $ER_2$, $ER_3$ and $ER_4$.

Figure 4:
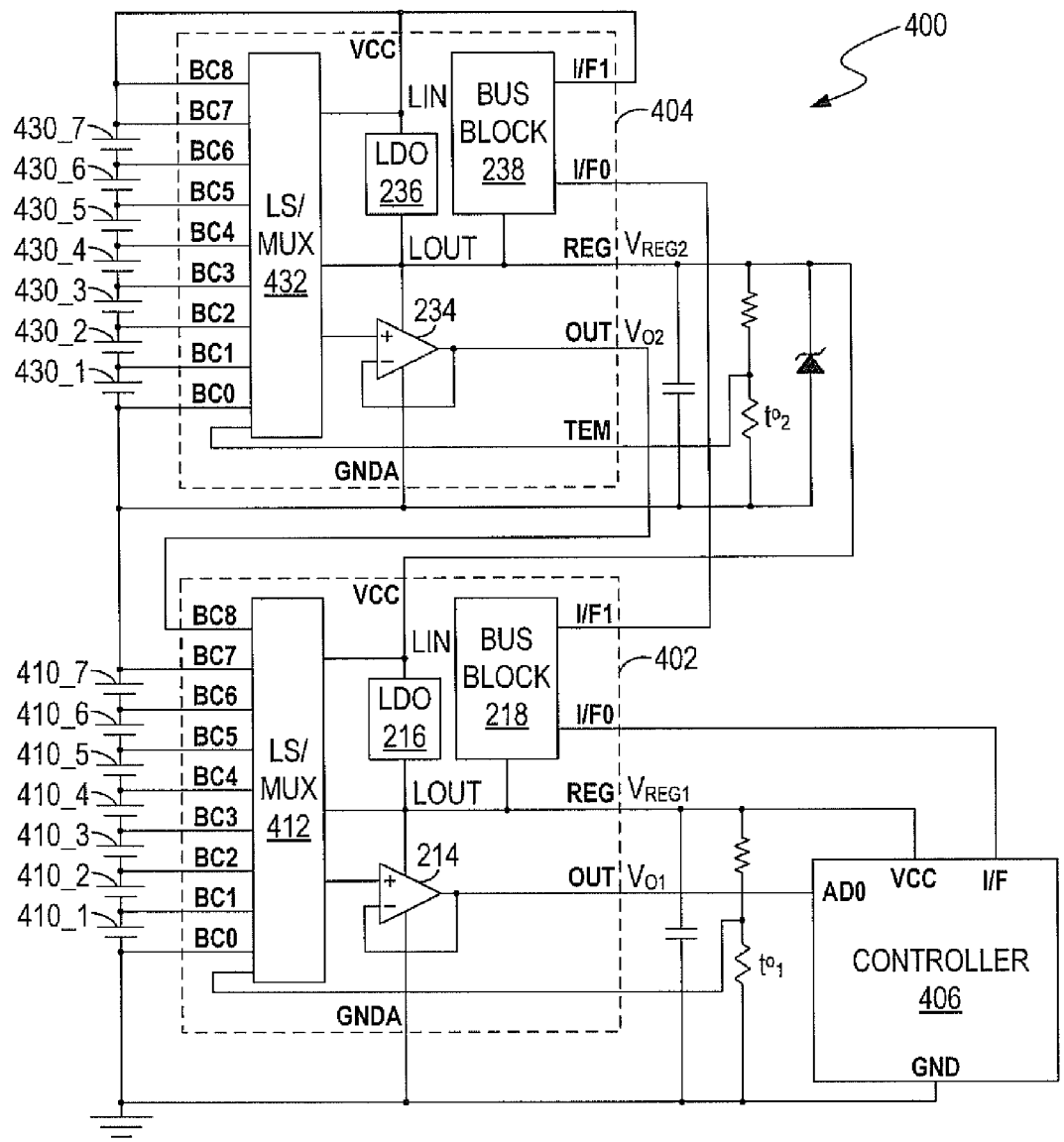
FIG. 4 illustrates a block diagram of an example of a battery monitoring system, in accordance with one embodiment of the present invention.

FIG. 4 illustrates a block diagram of an example of a BMS 400, in accordance with one embodiment of the present invention. As shown in FIG. 4, the BMS 400 includes a high-side module 404 and a low-side module 402. The modules 402 and 404 have similar structure to the modules 202 and 204 in FIG. 2. In addition, an input terminal LIN of the LDO 216 and an output terminal LOUT of the LDO 216 are coupled to the LS/MUX 412. Thus, the LS/MUX 412 can selectively receive a cell voltage of the cells 410_1-410_7, or an input voltage of the LDO 216 (e.g., an output voltage $V_{REG2}$ of the LDO 236), or an output voltage $V_{REG1}$ of the LDO 216. Similarly, an input terminal LIN of the LDO 236 and an output terminal LOUT of the LDO 236 are coupled to the LS/MUX 432. Thus, the LS/MUX 432 can selectively receive a cell voltage of the cells 430_1-430_7, or an input voltage of the LDO 236, or the output voltage $V_{REG2}$ of the LDO 236. In one such embodiment, the output voltage $V_{REG1}$ of the LDO 216 and the output voltage $V_{REG2}$ of the LDO 236 are used as reference signals for calibration process.

More specifically, in one embodiment, the low-side module 402 shifts a reference signal, e.g., the output voltage $V_{REG1}$ of the LDO 216, to a shifted signal $V'_{S4}$. For example, the LS/MUX 412 receives the output voltage $V_{REG1}$ and transfers the output voltage $V_{REG1}$ to the OUT terminal of the low-side module 402 via the buffer 214. As such, the shifted signal $V'_{S4}$ is generated at the OUT terminal of the low-side module 402. The shifted signal $V'_{S4}$ is determined by the output voltage $V_{REG1}$ and the error factor $ER_1$ of the low-side module 402. The controller 406 receives the shifted signal $V'_{S4}$ via the input terminal AD0 and the output voltage $V_{REG1}$ via the power input terminal VCC of the controller 406, and calculates the error factor $ER_1$ of the low-side module 402 according to the output voltage $V_{REG1}$ and the shifted signal $V'_{S4}$.

Moreover, the high-side module 404 shifts a reference signal, e.g., the output voltage $V_{REG2}$ of the LDO 236, to a first shifted signal $V'_{S1}$. The low-side module 402 also shifts the output voltage $V_{REG2}$ to a second shifted signal $V'_{S2}$. The low-side module 402 further shifts the first shifted signal $V'_{S1}$ to a third shifted signal $V'_{S3}$. By way of example, the LS/MUX 432 receives the output voltage $V_{REG2}$ and transfers the output voltage $V_{REG2}$ to the OUT terminal of the high-side module 404 via the buffer 234. As such, the first shifted signal $V'_{S1}$ is generated at the OUT terminal of the high-side module 404. The first shifted signal $V'_{S1}$ is determined by the output voltage $V_{REG2}$ and the error factor $ER_2$ of the high-side module 404. In addition, the LS/MUX 412 receives the output voltage $V_{REG2}$ of the LDO 236, e.g., the input voltage of the LDO 216, and transfers the output voltage $V_{REG2}$ to the OUT terminal of the low-side module 402 via the buffer 214. As such, the second shifted signal $V'_{S2}$ is generated at the OUT terminal of the low-side module 402. The second shifted signal $V'_{S2}$ is determined by the output voltage $V_{REG2}$ and the error factor $ER_1$ of the low-side module 402. Moreover, the LS/MUX 412 receives the first shifted signal $V'_{S1}$ via the OUT terminal of the high-side module 404 and the monitoring terminal BC8 of the low-side module 402, and transfers the first shifted signal $V'_{S1}$ to the OUT terminal of the low-side module 402 via the buffer 214. As such, the third shifted signal $V'_{S3}$ is generated at the OUT terminal of the low-side module 402. The third shifted signal $V'_{S3}$ is determined by the first shifted signal $V'_{S1}$ and the error factor $ER_1$ of the low-side module 202. The controller 206 calculates the output voltage $V_{REG2}$ according to the second shifted signal $V'_{S2}$ and the error factor $ER_1$ of the low-side module 402. The controller 406 also calculates the first shifted signal $V'_{S1}$ according to the third shifted signal $V'_{S3}$ and the error factor $ER_1$. Thus, the controller 406 calculates the error factor $ER_2$ of the high-side module 404 according to the calculated output voltage $V_{REG2}$ and the calculated first shifted signal $V'_{S1}$. In other words, the controller 406 can calculate the error factor $ER_2$ of the high-side module 404 according to the error factor $ER_1$ of the low-side module 402 and according to the second and third shifted signals $V'_{S2}$ and $V'_{S3}$.

Similar to the calibration process descried in relation to FIG. 2, the controller 406 can calibrate the received cell information of the cells 410_1-410_7 and 430_1-430_7, e.g., the output signal at the OUT terminal of the low-side module 402, based on the calculated error factors $ER_1$ and $ER_2$.

Additionally, in one embodiment of the present invention, a battery monitoring system can include any number of monitoring modules similar to the low-side module 402 or the high-side module 404, and each monitoring module can include any number of monitoring terminals.

Figure 5:
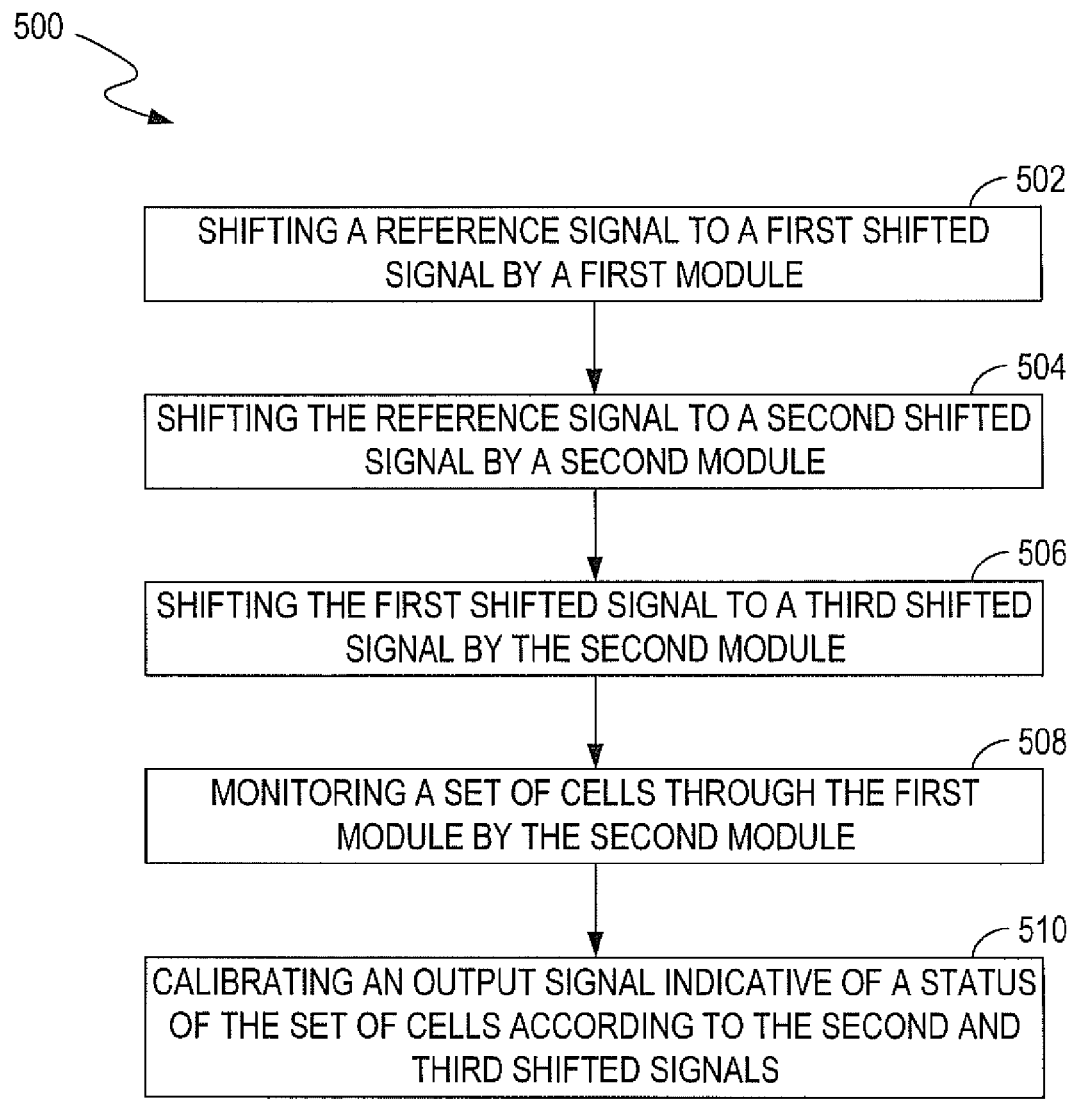
FIG. 5 illustrates a flowchart of examples of operations performed by a battery monitoring system, in accordance with one embodiment of the present invention.

FIG. 5 illustrates a flowchart 500 of examples of operations performed by a battery monitoring system, in accordance with one embodiment of the present invention.

In block 502, a first module (e.g., the high-side module 204 in FIG. 2, the monitoring module 304 in FIG. 3, or the high-side module 404 in FIG. 4) shifts a reference signal (e.g., the cell voltage $V_{CELL7}$ of the cell 230_1 in FIG. 2, the cell voltage of the bottom cell of the cells 312 in FIG. 3, or the output voltage $V_{REG2}$ from the LDO 236 in FIG. 4) to a first shifted signal.

In block 504, a second module (e.g., the low-side module 202 in FIG. 2, the monitoring module 302 in FIG. 3, or the low-side module 402 in FIG. 4) shifts the reference signal to a second shifted signal. In block 506, the second module further shifts the first shifted signal to a third shifted signal.

In block 508, the second module (e.g., the low-side module 202 in FIG. 2, the monitoring module 302 in FIG. 3, or the low-side module 402 in FIG. 4) monitors a set of cells (e.g., the cells 230_1-230_6 in FIG. 2, the cells 312 in FIG. 3, or the cells 430_1-430_7 in FIG. 4) through the first module (e.g., the high-side module 204 in FIG. 2, the monitoring module 304 in FIG. 3, or the high-side module 404 in FIG. 4).

In block 510, a controller (e.g., the controller 206, the controller 306, or the controller 406) calibrates an output signal indicative of a status (e.g., a cell voltage of each cell, or the temperature) of the set of cells (e.g., the cells 230_1-230_6 in FIG. 2, the cells 312 in FIG. 3, or the cells 430_1-430_7 in FIG. 4) according to the second and third shifted signals.

In summary, embodiments according to the present invention provide battery monitoring systems for monitoring multiple sets of cells. Multiple monitoring modules in the battery monitoring system can monitor multiple sets of cells respectively, and transfer the monitored cell information to a controller through the monitoring modules. The monitoring modules can also transfer reference signals such as cell voltages of predetermined cells and/or voltages provided by voltage regulators to the controller. Thus, the controller can compensate error factors that may exit in the monitoring modules according to the reference signals to calibrate (or correct) the received cell information. As a result, the cost, the power consumption, and the size of the PCB for the battery monitoring system are reduced, and the battery monitoring system can monitor the multiple sets of cells more accurately.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A battery monitoring system comprising:
    a first module operable for shifting a reference signal to a first shifted signal; and
    a second module coupled to said first module and operable for shifting said reference signal to a second shifted signal, shifting said first shifted signal to a third shifted signal, monitoring a first plurality of cells through said first module, and providing a first output signal indicative of a status of said first plurality of cells,
    wherein said second and third shifted signals are useful for calibrating said first output signal.

2. The battery monitoring system as claimed in claim 1, wherein said first module receives said reference signal and generates said first shifted signal indicative of said reference signal, wherein said second module receives said reference signal and generates said second shifted signal indicative of said reference signal, and wherein said second module receives said first shifted signal and generates said third shifted signal indicative of said first shifted signal.

3. The battery monitoring system as claimed in claim 1, wherein said first module receives a voltage of each cell of said first plurality of cells and generates a second output signal indicative of said voltage of each cell of said first plurality of cells, and wherein said second module receives said second output signal and generates said first output signal indicative of said second output signal.

4. The battery monitoring system as claimed in claim 1, wherein said first module is operable for receiving a voltage of each cell of said first plurality of cells, and wherein said second module is operable for receiving a voltage of each cell of a second plurality of cells coupled in series with said first plurality of cells.

5. The battery monitoring system as claimed in claim 1, further comprising:
a controller operable for calculating a first error factor of said first module according to a second error factor of said second module and according to said second and third shifted signals, and calculating a calibrated level of said first output signal according to said first and second error factors.

6. The battery monitoring system as claimed in claim 5, wherein said second module receives a voltage of a first predetermined cell of a second plurality of cells and generates a fourth shifted signal indicative of said voltage of said first predetermined cell, and wherein said controller calculates said second error factor according to said voltage of said first predetermined cell and said fourth shifted signal.

7. The battery monitoring system as claimed in claim 5, wherein said second module receives a voltage provided by a voltage regulator and generates a fourth shifted signal indicative of said voltage from said voltage regulator, and wherein said controller calculates said second error factor according to said voltage from said voltage regulator and said fourth shifted signal.

8. The battery monitoring system as claimed in claim 1, wherein said reference signal comprises a voltage of a second predetermined cell of said first plurality of cells.

9. The battery monitoring system as claimed in claim 1, wherein said reference signal comprises a voltage provided by a voltage regulator.

10. A method comprising:
shifting a reference signal to a first shifted signal by a first module;
shifting said reference signal to a second shifted signal by a second module;
shifting said first shifted signal to a third shifted signal by said second module;
monitoring a plurality of cells through said first module by said second module; and
calibrating a first output signal indicative of a status of said plurality of cells according to said second and third shifted signals.

11. The method as claimed in claim 10, wherein said shifting said reference signal to said first shifted signal comprises receiving said reference signal at said first module to generate said first shifted signal, wherein said shifting said reference signal to said second shifted signal comprises receiving said reference signal at said second module to generate said second shifted signal, and wherein said shifting said first shifted signal to said third shifted signal comprises receiving said first shifted signal at said second module to generate said third shifted signal.

12. The method as claimed in claim 10, wherein said monitoring comprises:
receiving a voltage of each cell of said plurality of cells at said first module to generate a second output signal indicative of said voltage of each cell of said plurality of cells; and
receiving said second output signal at said second module to generate said first output signal indicative of said second output signal.

13. The method as claimed in claim 10, wherein said calibrating comprises:
calculating an error factor of said first module according to said second and third shifted signals; and
calculating a calibrated level of said first output signal according to said error factor.

14. The method as claimed in claim 10, wherein said reference signal comprises a voltage of a cell of said plurality of cells.

15. The method as claimed in claim 10, wherein said reference signal comprises a voltage provided by a voltage regulator.

16. A battery monitoring system comprising:
a first module operable for receiving, from a second module, a first output signal indicative of a status of a plurality of cells, operable for generating a second output signal indicative of said first output signal, operable for receiving, from said second module, a first shifted signal indicative of a reference signal, operable for generating a second shifted signal indicative of said first shifted signal, and operable for receiving said reference signal to generate a third shifted signal indicative of said reference signal; and
a controller coupled to said first module and operable for calibrating said second output signal according to said second and third shifted signals.

17. The battery monitoring system as claimed in claim 16, wherein said second module receives a voltage of each cell of said plurality of cells and generates said first output signal to said first module.

18. The battery monitoring system as claimed in claim 16, wherein said controller is operable for calculating an error factor of said battery monitoring system according to said second and third shifted signals, and for calculating a calibrated level of said second output signal according to said error factor.

19. The battery monitoring system as claimed in claim 16, wherein said reference signal comprises a voltage of a cell of said plurality of cells.

20. The battery monitoring system as claimed in claim 16, wherein said reference signal comprises a voltage provided by a voltage regulator.

* * * * *